United States Patent [19]

Matsunaga

[11] Patent Number: 4,476,057

[45] Date of Patent: Oct. 9, 1984

[54] PROCESS OF PRODUCING PEANUT OIL

[76] Inventor: Akihiro Matsunaga, No. 21-2, 1-chome, Kami-Itabashi, Itabashi-ku, Tokyo, Japan

[21] Appl. No.: 425,062

[22] Filed: Sep. 27, 1982

[30] Foreign Application Priority Data

Sep. 26, 1981 [JP] Japan ................................ 56-152307

[51] Int. Cl.[3] ............................ C09F 5/02; C11B 1/00

[52] U.S. Cl. .................................................. 260/412.2

[58] Field of Search ...................................... 260/412.2

[56] References Cited

U.S. PATENT DOCUMENTS 307,124 10/1884 Leder .............................. 260/412.2

2,331,785 10/1943 Lachle ............................. 260/412.2

3,083,365 3/1963 Roxas .............................. 260/412.2

4,035,194 7/1977 Grassl .............................. 260/412.2

*Primary Examiner*—Anton H. Sutto

*Assistant Examiner*—Y. Harris Smith

*Attorney, Agent, or Firm*—Martin Smolowitz

[57] ABSTRACT

A process of producing a peanut oil, comprising a first stage of immersing peanut seeds cleared of the skins in hot water for a predetermined period of time, cooking the resultant peanut seeds in an equal volume of hot water at a predetermined temperature under a predetermined pressure for a predetermined period of time, grinding the cooked peanut seeds into the form of slurry, diluting the slurry with an equal volume of hot water, and mechanically fractionating the diluted slurry into a liquid fraction and a solid fraction; a second stage of mechanically fractionating the liquid fraction into a water fraction, an oil fraction and a residual solid fraction; and a third stage of adding an aqueous solution of salt to the liquid fraction obtained in the second stage for forming a layer of peanut oil over a layer of solid constituents, and separating the layer of the peanut oil from the layer of the solid constituents.

22 Claims, 1 Drawing Figure

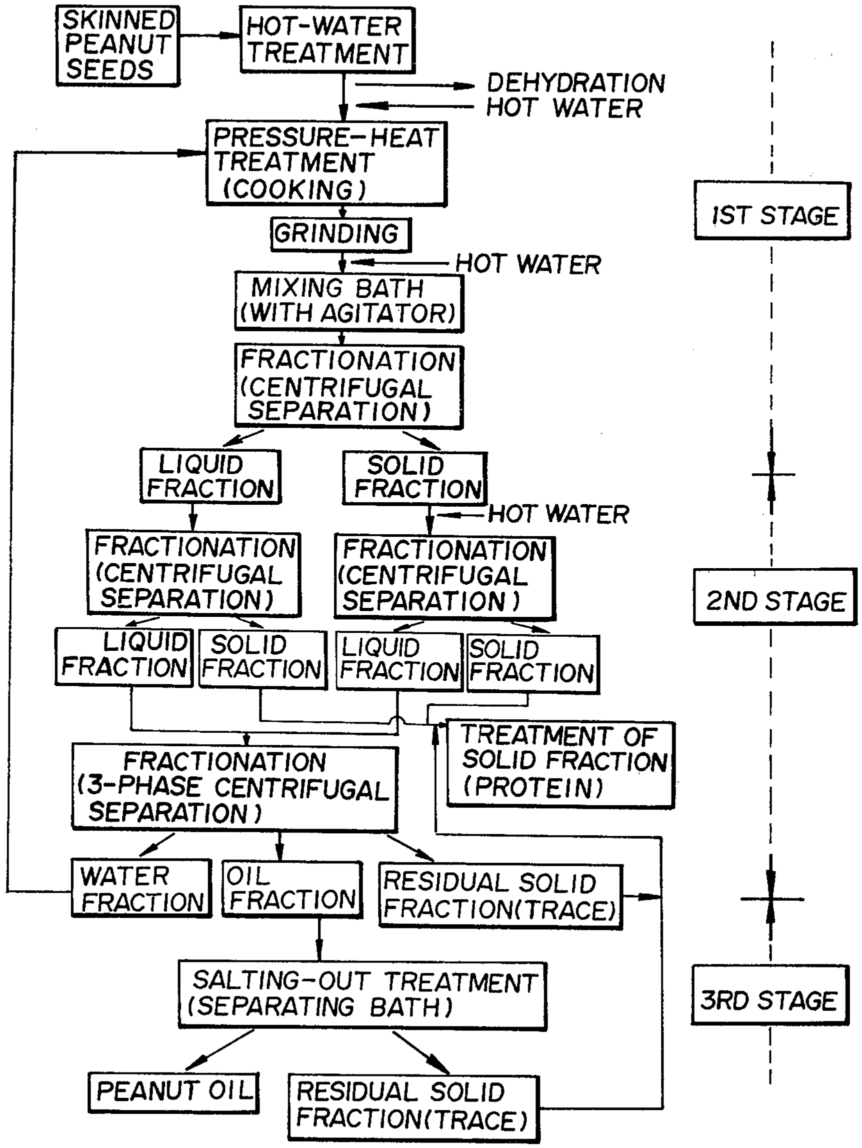
SKINNED PEANUT SEEDS
HOT-WATER TREATMENT
DEHYDRATION
HOT WATER
PRESSURE-HEAT TREATMENT (COOKING)
GRINDING
HOT WATER
MIXING BATH (WITH AGITATOR)
FRACTIONATION (CENTRIFUGAL SEPARATION)
LIQUID FRACTION
SOLID FRACTION
HOT WATER
FRACTIONATION (CENTRIFUGAL SEPARATION)
FRACTIONATION (CENTRIFUGAL SEPARATION)
LIQUID FRACTION
SOLID FRACTION
LIQUID FRACTION
SOLID FRACTION
TREATMENT OF SOLID FRACTION (PROTEIN)
FRACTIONATION (3-PHASE CENTRIFUGAL SEPARATION)
WATER FRACTION
OIL FRACTION
RESIDUAL SOLID FRACTION(TRACE)
SALTING-OUT TREATMENT (SEPARATING BATH)
PEANUT OIL
RESIDUAL SOLID FRACTION(TRACE)
1ST STAGE
2ND STAGE
3RD STAGE

PROCESS OF PRODUCING PEANUT OIL

FIELD OF THE INVENTION

The present invention relates to a process of producing a vegetable oil and more particularly to a process of producing a peanut oil from peanut seeds cleared of the shells and skins.

BACKGROUND OF THE INVENTION

As is well known in the art, a peanut oil is produced by mechanically pressing and extracting oil from the pressed and crushed seeds. The peanut seeds which are to be thus processed for the production of a peanut oil have testae or skins containing tannin on their inner surfaces. The astringent content, tannin, of the peanut seeds has a bitter taste and an objectionable odor and is responsible for the tendency of the extracted oil to be oxidized when heated to a high temperature during the pressing and extracting procedures.

To provide a useful solution to such a problem, the inventor has developed an improved process of producing a peanut oil, the process being taught in Japanese Patent Application No. 49-122387 (now Japanese Provisional Patent Publication No. 51-49209). In the process disclosed therein, peanut seeds cleared of skins are immersed in a solution of salt for a predetermined period of time and are thereafter cooked in a dual-shell steam tank. The dual-shell steam tank must thus be coated with a special anti-corrosive lining and a subsequent high-pressure, high-temperature treatment. Since, furthermore, some organic and inorganic acids are used during separation of oil from a solid fraction in a separating bath, a neutralizing step must be taken to prevent corrosion of the separating bath and from the view point of food sanitation. Addition of such a step gives rise to an increase in the number of the steps of the process and further results in the grade the final product due to the existence of a neutralizing compound which may be left on the inner surfaces of the separating bath. The present invention contemplates provision of solutions to these problems encountered in prior-art processes of producing peanut oil.

SUMMARY OF THE INVENTION

In accordance with the present invention, there is provided a process of producing a peanut oil, comprising a first stage comprising the steps of (1) immersing peanut seeds cleared of the skins in hot water for a predetermined period of time, (2) cooking the resultant peanut seeds in a substantially equal volume of hot water at a predetermined temperature under a predetermined pressure for a predetermined period of time, (3) grinding the cooked peanut seeds into the form of slurry, (4) diluting the slurry with a substantially equal volume of hot water, and (5) mechanically fractionating the diluted slurry into a liquid fraction and a solid fraction; a second stage comprising the step of (6) mechanically fractionating the liquid fraction into a water fraction, an oil fraction and a residual solid fraction; and a third stage comprising the steps of (7) adding an aqueous solution of salt to the liquid fraction obtained in the second stage for forming a layer of peanut oil over a layer of solid constituents, and (8) separating the layer of the peanut oil from the layer of the solid constituents. In the first stage of the process as above set forth, the peanut seeds are cooked preferably at a temperature within the range of between about 110° C. and about 140° C. under a pressure within the range of between about 1.5 kilogram per square meter and about 2.0 kilograms per square meter for a period of time within the range of between about 5 minutes and about 20 minutes. More preferably, the peanut seeds are cooked at a temperature within the range of between about 120° C. and about 130° C. under a pressure within the range of between about 1.5 kilogram per square meter and about 2.0 kilograms per square meter for a period of time within the range of between about 5 minutes and about 20 minutes. The above mentioned aqueous solution of salt used in the third stage of the process according to the present invention preferably contains about 7 percent to about 10 percent by weight of salt for about 10 percent to about 15 percent of the oil fraction. More preferably, the aqueous solution of salt contains about 10 percent by weight of salt for about 13 percent of the oil fraction. Furthermore, the slurry cooked and diluted with hot water is preferably fractionated by at least three steps which consist of a first step of mechanically fractionating the slurry into a liquid fraction and a solid fraction, a second step of mechanically fractionating the liquid fraction obtained in the first step into a liquid fraction and a solid fraction and a third step of mechanically fractionating the solid fraction obtained in the first step into a liquid fraction and a solid fraction, the second stage further comprising the step of mixing the liquid fractions respectively obtained in the second and third steps of fractionation, the resultant mixture of the liquid fractions being fractionated into the above mentioned water fraction, oil fraction and residual solid fraction. In this instance, the second stage of the process according to the present invention may further comprise the step of mixing the solid fractions respectively obtained in the second and third steps of fractionation, the resultant mixture of the solid fractions being subjected to a treatment to recover useful contents therefrom. Furthermore, the slurry of the peanut seeds is fractionated in the first stage preferably by the use of a centrifuge of a conveyor type or of a basket type, while the liquid fraction obtained in the first stage is fractionated into the aforesaid water fraction, oil fraction and residual solid fraction in the second stage preferably by the use of a three-phase centrifuge.

BRIEF DESCRIPTION OF THE DRAWINGS

The features and advantages of a process according to the present invention will be more clearly appreciated from the following description taken in conjunction with the accompanying drawing which is a flow chart showing the consecutive stages of a preferred example of the process according to the present invention.

DETAILED DESCRIPTION OF THE INVENTION

As set forth above, the process according to the present invention consists essentially of a succession of first, second and third stages. During the first stage, peanut seeds cleared of pods or shells and testae or skins are first immersed in hot water of, for example, about 100° C. for a predetermined period of time of, for example, about 3 minutes to about 5 minutes. In this instance, the peanut seeds may be immersed in the hot water either at an atmospheric pressure in a hot-water bath or at an elevated pressure, viz., at a pressure higher than an atmospheric pressure in a pressure cooker. The peanut seeds thus subjected to a hot-water treatment are, after being dehydrated, cooked in a substantially equal volume of boiled water preferably at a temperature within the range of between about 110° C. and about 140° C., under a pressure within the range of between about 1.5 kilogram per square meter and about 2.0 kilograms per square meter for a period of time within the range of between about 5 minutes and about 20 minutes. If the peanut seeds is immersed in hot water at an atmospheric pressure in a hot-water bath, the peanut seeds to be cooked may be transferred from the hot-water bath to a pressure cooker. If, on the other hand, the peanut seeds is immersed at an elevated temperature in a pressure cooker, the same pressure cooker may be used for the cooking of the peanut seeds. For the heating of the peanut seeds in the pressure cooker, hot water vapor is forced into the cooker so that the peanut seeds is heated to a temperature ranging from about 110° C. to about 140° C. as above mentioned. The peanut seeds thus cooked are cleared of tannin, astringent constituents and objectionable odors. The peanut seeds are then ground into the form of slurry by the use of, for example, a hammer mill.

The conditions for the cooking of the peanut seeds as above specified are important since the peanut seeds can be properly softened and efficiently and effectively cleared of objectionable tastes and odors as well as impurities without having recourse to a treatment in a saturated solution of salt or a nearly saturated boiled solution of salt insofar as the three conditions are concurrently followed. If at least one of the temperature, pressure and period of the cooking procedure is less than the lower limit thereof, viz., the cooking temperature is lower than about 110° C., the cooking pressure is lower than about 1.5 kilogram per square meter or the cooking period is shorter than about 5 minutes, the peanut seeds partially remain uncooked and, as a consequence, could not be ground into evenly grained slurry in the subsequent step. If, on the other hand, at least one of the temperature, pressure and period of the cooking procedure exceeds the lower limit thereof, viz., the cooking temperature is higher than about 140° C., the cooking pressure is higher than about 2.0 kilograms per square meter or the cooking period is longer than about 20 minutes, then the peanut seeds would be excessively cooked and would not only generate a burnt or smoky smell but also promote the oxidation of the oil content of the cooked seeds, thereby also degrading the resultant slurry. For these reasons, it is more preferable in the process according to the present invention that peanut seeds be cooked at a temperature within the range of between about 120° C. and about 130° C., under a pressure within the range of between about 1.8 kilogram per square meter and about 2.0 kilograms per square meter for a period of time within the range of between about 5 minutes and about 15 minutes.

The slurry of the pulverized peanut seeds thus prepared is diluted with a substantially equal volume of hot water of a predetermined temperature within the range of, for example, from about 90° C. to about 100° C. in a mixing bath provided with an agitator. The resultant mixture, viz., diluted slurry is mechanically fractionated into liquid and solid fractions repeatedly in three or more steps which consist of a first step of fractionating the slurry and second and third steps of fractionating the liquid and solid fractions, respectively, obtained in the first step of fractionation. For the mechanical fractionation of the diluted slurry, it is preferable to use a centrifuge of either the conveyor or decanter type or the basket type. (A preferred example of a centrifuge of the conveyor or decanter type is Mitsubishi Decanting Centrifuge which is manufactured by Mitsubishi Kakoki Kabushiki Kaisha, Tokyo.) In a process according to the present invention, about 80 percent to about 85 percent of liquid fraction and about 15 percent to about 20 percent of solid fraction can be obtained in the first step of fractionation and a total of about 90 percent to about 95 percent of liquid fraction and a total of about 5 percent to about 10 percent of solid fraction can be obtained in the second and third steps of fractionation. In this connection, it may be noted that at least several steps were required for the mechanical fractionation of the slurry to obtain liquid and solid fractions in the above mentioned proportions when a centrifuge of the Scharples type, viz., the tubular-bowl type was used. This means that the use of a Scharples-type centrifuge for the fractionation of the slurried peanut seeds in the process according to the present invention is not advisable from the view point of production efficiency and process control. It may further be noted that, if the cooked peanut seeds are diluted with cold water in lieu of hot water and the resultant mixture of the slurry and cold water is heated with hot water vapor, the addition of the cold water to the slurry would invite a drop in the temperature of the slurry and would give rise to a decrease in the efficiency of fractionation of the slurry. The second and third steps of fractionation put an end to the first stage of the process according to the present invention.

The first stage of the process according to the present invention is followed by the second stage, which begins with further fractionation of the liquid fraction of the slurried peanut seeds obtained in the first stage. In the second stage of the process according to the present invention, the liquid fraction of the slurry is mechanically fractionated into a water fraction, oil fraction and a residual solid fraction by the use of, preferably, a three-phase centrifuge of, preferably, the self-ejector type. (A preferred example of such a centrifuge is Mitsubishi Self-Ejector manufactured by Mitsubishi Kakoki Kabushiki Kaisha, Tokyo.) In a process experimentally carried out by the inventor, a liquid fraction obtained from the diluted slurry of the pulverized peanut seeds was fractionated by the use of such a centrifuge with the result that about 60 percent to about 70 percent of water fraction, about 30 percent to about 35 percent of oil fraction and a trace (about 0.001 percent) of solid fraction were obtained. Practically similar results were achieved when the liquid fraction of the slurry was fractionated repeatedly in two steps. This means that only a single step suffices for the fractionation of the liquid fraction of the slurry from the view point of production efficiency.

During the second stage of the process according to the present invention, not only the liquid fraction but also the solid fraction of the slurry may be further fractionated. For this purpose, the liquid fraction obtained by the fractionation of the slurry is mechanically fractionated into liquid and solid fractions by the use of a conveyor-type or basket-type centrifuge. On the other hand, the solid fraction obtained by the fractionation of the slurry is diluted with a substantially equal volume of hot water and is also mechanically fractionated into liquid and solid fractions by the use of a centrifuge of the conveyor or basket type. The liquid fractions thus obtained by the fractionation of the liquid and solid fractions are then mixed together and the resultant mixture is further fractionated into a water fraction, an oil fraction and trace of residual solid fraction preferably by the use of a three-phase centrifuge of the self-ejector type. The solid fraction thus obtained may be mixed with the solid fractions obtained by the fractionation of the liquid and solid fractions produced in the second and third steps of fractionation and the resultant mixture of the solid fractions may be transferred to an external, viz., out-of-line stage so as to be subjected to a treatment to recover useful solid contents such as protein therefrom. The water fraction obtained by the final fractionation in the second stage may be circulated to the pressure cooker used in the first stage.

The oil fraction thus obtained in the second stage is in the form of an emulsion. It is for this reason required to separate a trace of solid impurities from the emulsion of oil by addition of a suitable electrolyte such as an aqueous solution of salt in the third stage of the process according to the present invention. For this purpose, the oil fraction obtained in the second stage of the process according to the present invention is introduced into a separating bath and is therein mixed with an aqueous solution of salt. In this instance, the aqueous solution of salt preferably contains about 7 percent to about 10 percent by weight of salt for about 10 percent to about 15 percent of the oil fraction or, more preferably about 10 percent by weight of salt for about 13 percent of the oil fraction. The addition of the aqueous solution of salt to the oil fraction causes demulsification of the oil and thereby gives rise to a decrease in the degree of dispersion of the solid impurities in the oil, with the result that the solid impurities in the oil fraction are precipitated in the separating bath. As a result of the addition of the aqueous solution of salt to the oil fraction, there is thus formed a layer of oil over a layer of the solid impurities in the separating bath. The layer of oil thus formed in the separating bath is separated as a clear, odorless peanut oil from the layer of the solid impurities. The solid impurities left in the separating bath may be transferred to the previously mentioned out-of-line stage for being subjected to the treatment to recover useful contents such as protein therefrom. The peanut oil separated from the solid impurities in the third stage may be used as a primary product or may be refined in a known manner to obtain a secondary product for food use.

The various aspects of the process according to the present invention will be more clearly and specifically understood from the following Examples.

EXAMPLE 1

5 kilograms of peanut seeds cleared of shells and skins were immersed in about 8 liters of hot water of about 100° C. for a period of time of about 5 minutes at an atmospheric pressure in a hot-water bath having the capacity of 0.5 cubic meter. The peanut seeds thus subjected to a hot-water treatment were, after being dehydrated, introduced into a pressure cooker having the capacity of about 1.0 cubic meter and was immersed in about 7.5 liters of hot water of about 110° C. The peanut seeds were then cooked at the temperature of about 120° C. (by heating with hot water vapor), under the pressure of about 1.8 kilogram per square meter for a period of time of about 15 minutes. The peanut seeds thus cooked were softened and cleared of tannin, astringent constituents and objectionable odors. The peanut seeds were then ground into the form of slurry by the use of, for example, a hammer mill. The slurry of the pulverized peanut seeds thus prepared was introduced together with a substantially equal volume of hot water of about 90° C. to about 100° C. into a mixing bath having the capacity of about 1.5 cubic meter and equipped with an agitator being driven for rotation at 300 rpm. The slurry was continuously agitated in the hot water for several minutes and was thereby diluted with the hot water. The resultant mixture, viz., diluted slurry was fed to a centrifuge of the conveyor or decanter type (Mitsubishi Decanting Centrifuge) and was fractionated into liquid and solid fractions. Each of the liquid and solid fractions thus obtained in the first step of fractionation was further fractionated by the use of a centrifuge of the same type. The solid fraction fractionated in the third step was diluted with a substantially equal volume of hot water of about 90° C. to about 100° C. As a result of these second and third steps of fractionation, about 90 percent of liquid fraction and about 10 percent of solid fraction were obtained from the liquid fraction and about 80 percent of liquid fraction in the second step of fractionation and about 20 percent of solid fraction were obtained from the solid fraction in the third step of fractionation. The liquid fractions obtained in the second and third steps of fractionation were mixed together and were further mechanically fractionated by the use of a three-phase centrifuge of the self-ejector type (Mitsubishi Self-Ejector). About 68 percent of water fraction, about 32 percent of oil fraction and a trace (about 0.002 percent) of residual solid fraction were obtained by this step. The solid fraction thus obtained was mixed with the solid fractions obtained by the fractionation of the liquid and solid fractions produced in the second and third steps of fractionation and the resultant mixture of the solid fractions was transferred to an out-of-line stage so as to be subjected to a treatment to recover useful solid contents such as protein therefrom. The water fraction obtained by the final fractionation in the second stage was circulated to the pressure cooker used in the first stage.

The oil fraction thus obtained in the second stage was introduced into a separating bath having the capacity of about 1.5 cubic meter and was therein mixed with an aqueous solution containing about 10 percent by weight of salt. The aqueous solution of salt was added to the oil in the ratio of about 10 percent by weight to the oil in the separating bath. The resultant mixture was stirred and thereafter set aside to cause demulsification of the oil until the solid impurities in the oil fraction were precipitated in the separating bath and a layer of oil was formed over a layer of the solid impurities in the separating bath. By separation of the layer of oil from the lower layer of the solid impurities, about 2.001 kilograms of a clear and odorless peanut oil having a specific gravity of 0.918 was obtained.

EXAMPLE 2

5 kilograms of peanut seeds cleared of shells and skins were immersed in about 8 liters of hot water of about 100° C. for a period of time of about 5 minutes at an atmospheric pressure in a hot-water bath having the capacity of 1.0 cubic meter. The peanut seeds thus subjected to a hot-water treatment were, after being dehydrated, immersed in about 7.5 liters of hot water of about 100° C. as in Example 1. The peanut seeds were then cooked at the temperature of about 130° C. (by heating with hot water vapor), under the pressure of about 1.8 kilogram per square meter for a period of time of about 8 minutes so as to be softened and cleared of tannin, astringent constituents and objectionable odors. The peanut seeds were then processed as in Example 1 with the result that 1.965 kilogram of a clear and odorless peanut oil having a specific gravity of 0.918 was obtained.

EXAMPLE 3

5 grams of peanut seeds cleared of shells and skins were immersed in about 8 liters of hot water of about 100° C. for a period of time of about 3 minutes at an atmospheric pressure in a hot-water bath having the capacity of 1.0 cubic meter. The peanut seeds thus subjected to a hot-water treatment were, after being dehydrated, immersed in about 7.5 liters of hot water of about 100° C. as in Example 1. The peanut seeds were then cooked at the temperature of about 130° C. (by heating with hot water vapor), under the pressure of about 2.0 kilograms per square meter for a period of time of about 10 minutes. The peanut seeds were then processed as in Example 1 with the result that 1.987 kilogram of a clear and odorless peanut oil having a specific gravity of 0.918 was obtained.

EXAMPLE 4

5 kilograms of peanut seeds cleared of shells and skins were immersed in about 8 liters of hot water of about 100° C. for a period of time of about 3 minutes at an atmospheric pressure in a hot-water bath having the capacity of 1.0 cubic meter. The peanut seeds thus subjected to a hot-water treatment were, after being dehydrated, immersed in about 7.5 liters of hot water of about 100° C. as in Example 1. The peanut seeds were then cooked at the temperature of about 115° C. (by heating with hot water vapor), under the pressure of about 2.0 kilograms per square meter for a period of time of about 20 minutes. The peanut seeds were then processed as in Example 1 with the result that 2.024 kilograms of a clear and odorless peanut oil having a specific gravity of 0.918 was obtained.

EXAMPLE 5

5 kilograms of peanut seeds cleared of shells and skins were immersed in about 8 liters of hot water of about 100° C. for a period of time of about 3 minutes at an atmospheric pressure in a hot-water bath having the capacity of 1.0 cubic meter. The peanut seeds thus subjected to a hot-water treatment were, after being dehydrated, immersed in about 7.5 liters of hot water of about 100° C. as in Example 1. The peanut seeds were then cooked at the temperature of about 140° C. (by heating with hot water vapor), under the pressure of about 2.0 kilograms per square meter for a period of time of about 5 minutes. The peanut seeds were then processed as in Example 1 with the result that 2.047 kilograms of a clear and odorless peanut oil having a specific gravity of 0.918 was obtained.

EXAMPLE 6

5 kilograms of peanut seeds cleared of shells and skins were immersed in about 8 liters of hot water of about 100° C. for a period of time of about 3 minutes at an atmospheric pressure in a hot-water bath having the capacity of 1.0 cubic meter. The peanut seeds thus subjected to a hot-water treatment were, after being dehydrated, immersed in about 7.5 liters of hot water of about 100° C. as in Example 1. The peanut seeds were then cooked at the temperature of about 110° C. (by heating with hot water vapor), under the pressure of about 1.8 kilogram per square meter for a period of time of about 20 minutes. The peanut seeds were then processed as in Example 1 with the result that 2.019 kilograms of a clear and odorless peanut oil having a specific gravity of 0.918 was obtained.

EXAMPLE 7

5 kilograms of peanut seeds cleared of shells and skins were immersed in about 8 liters of hot water of about 100° C. for a period of time of about 3 minutes at an atmospheric pressure in a hot-water bath having the capacity of 1.0 cubic meter. The peanut seeds thus subjected to a hot-water treatment were, after being dehydrated, immersed in about 7.5 liters of hot water of about 100° C. as in Example 1. The peanut seeds were then cooked at the temperature of about 140° C. (by heating with hot water vapor), under the pressure of about 1.5 kilogram per square meter for a period of time of about 10 minutes. The peanut seeds were then processed as in Example 1 with the result that 2.011 kilograms of a clear and odorless peanut oil having a specific gravity of 0.918 was obtained.

Each of the clear and odorless peanut oils obtained as primary products in Examples 1 to 7 was refined in a known manner so as to produce a highly graded secondary product for food use. Tests were then conducted with these secondary products for the properties such as the flavors, tints, moistures (in percentage), specific gravities (of 25 grams at 25° C.), indices of refraction (at 25° C.), acid value, saponification value, and iodine value. The specimens were further subjected to cold tests to see if the oils remain clear or become cloudy or solidified when cooled to 0° C. The following table shows the results of these tests.

| Properties | Primary Products | Secondary Products | Remarks |
|---|---|---|---|
| Flavors | Excellent | Excellent | No objectionable odors |
| Tints | 43Y, 3.9R | 40Y, 3.4R | Tested by Lovibond Tintometer (133.4 mm) |
| Moistures | 0.04% | 0.019% | |
| Specific Gravities | 0.918 | 0.917 | |
| Indices of Refraction | 1.467 | 1.468 | |
| Acid Values | 0.44 | 0.43 | |
| Saponification Values | 189.1 | 189.1 | |
| Iodine Values | 96.6 | 96.3 | |
| Results of Cold Tests | Unclouded (Clear) | Unclouded (Clear) | In cold water, for 5.5 hours |

As will have been appreciated from the foregoing description, the process according to the present invention is characterized, inter alia, in that an organic solvent such as hexane is not used for the fractionation of the slurried peanut seeds so that the primary and secondary products obtained by the process is fully acceptable from the view point of food sanitation. Because, furthermore, of the fact that hexane is not used in the process according to the present invention, the plants and equipment to carry out the process can be designed and engineered without any design considerations paid to the removal of the organic solvent from the final products of the process. This will contribute to simplification of the plants and equipment and further to improvement in the production efficiency and reduction of the production cost of peanut oils. The peanut oils which are to be produced by the process according to the present invention are thus expected to find a wide variety of applications not only as edible materials but also for medical and cosmetic uses.

What is claimed is:

1. A process of producing a peanut oil, comprising a first stage comprising the steps of (1) immersing peanut seeds cleared of the skins in hot water for a predetermined period of time, (2) cooking the resultant peanut seeds in a substantially equal volume of hot water at a predetermined temperature under a predetermined pressure for a predetermined period of time, (3) grinding the cooked peanut seeds into the form of slurry, (4) diluting the slurry with a substantially equal volume of hot water, and (5) mechanically fractionating the diluted slurry into a liquid fraction and a solid fraction, a second stage comprising the step of (6) mechanically fractionating said liquid fraction into a water fraction, an oil fraction and a residual solid fraction, and a third stage comprising the steps of (7) adding an aqueous solution of salt to the liquid fraction obtained in the second stage for forming a layer of peanut oil over a layer of solid constituents, and (8) separating the layer of the peanut oil from the layer of the solid constituents.

2. A process as set forth in claim 1, in which the peanut seeds are cooked at a temperature within the range of between about 110° C. and about 140° C. under a pressure within the range of between about 1.5 kilogram per square meter and about 2.0 kilograms per square meter for a period of time within the range of between about 5 minutes and about 20 minutes.

3. A process as set forth in claim 1, in which the peanut seeds are cooked at a temperature within the range of between about 120° C. and about 130° C. under a pressure within the range of between about 1.5 kilogram per square meter and about 2.0 kilograms per square meter for a period of time within the range of between about 5 minutes and about 20 minutes.

4. A process of producing a peanut oil as set forth in claim 1, 2 or 3, in which said aqueous solution of salt contains about 7 percent to about 10 percent by weight of salt for about 10 percent to about 15 percent of the oil fraction.

5. A process of producing a peanut oil as set forth in claim 1, 2 or 3, in which said aqueous solution of salt contains about 10 percent by weight of salt for about 13 percent of the oil fraction.

6. A process of producing a peanut oil as set forth in claim 1, 2 or 3, in which said diluted slurry is fractionated by at least three steps which consist of a first step of mechanically fractionating the slurry into a liquid fraction and a solid fraction, a second step of mechanically fractionating the liquid fraction obtained in the first step into a liquid fraction and a solid fraction and a third step of mechanically fractionating the solid fraction obtained in the first step into a liquid fraction and a solid fraction, the second stage further comprising the step of mixing the liquid fractions respectively obtained in the second and third steps of fractionation, the resultant mixture of the liquid fractions being fractionated into said water fraction, said oil fraction and said residual solid fraction.

7. A process of producing a peanut oil as set forth in claim 6, in which said second stage further comprises the step of mixing the solid fractions respectively obtained in the second and third steps of fractionation, the resultant mixture of the solid fractions being subjected to a treatment to recover useful contents therefrom.

8. A process of producing a peanut oil as set forth in claim 1, 2 or 3, in which said slurry is fractionated in said first stage by means of a centrifuge of a conveyor type.

9. A process of producing a peanut oil as set forth in claim 1, 2 or 3, in which said slurry is fractionated in said first stage by means of a centrifuge of a basket type.

10. A process of producing a peanut oil as set forth in claim 1, 2 or 3, in which the liquid fraction obtained in said first stage is fractionated into said water fraction, oil fraction and residual solid fraction in said second stage by means of a three-phase centrifuge.

11. A process of producing a peanut oil as set forth in claim 1, 2 or 3, in which said aqueous solution of salt contains about 7 percent to about 10 percent by weight of salt for about 10 percent to about 15 percent of the oil fraction, and in which said diluted slurry is fractionated by at least three steps which consist of a first step of mechanically fractionating the slurry into a liquid fraction and a solid fraction, a second step of mechanically fractionating the liquid fraction obtained in the first step into a liquid fraction and a solid fraction and a third step of mechanically fractionating the solid fraction obtained in the first step into a liquid fraction and a solid fraction, the second stage further comprising the step of mixing the liquid fractions respectively obtained in the second and third steps of fractionation, the resultant mixture of the liquid fractions being fractionated into said water fraction, said oil fraction and said residual solid fraction.

12. A process of producing a peanut oil as set forth in claim 11, in which said aqueous solution of salt contains about 10 percent by weight of salt for about 13 percent of the oil fraction.

13. A process of producing a peanut oil as set forth in claim 11, in which said second stage further comprises the step of mixing the solid fractions respectively obtained in the second and third steps of fractionation, the resultant mixture of the solid fractions being subjected to a treatment to recover useful contents therefrom.

14. A process of producing a peanut oil as set forth in claim 11, in which said slurry is fractionated in said first step of fractionation by means of a centrifuge of a conveyor type.

15. A process of producing a peanut oil as set forth in claim 11, in which each of the liquid and solid fractions obtained in said first step of fractionation is fractionated in each of said second and third steps of fractionation by means of a centrifuge of a conveyor type.

16. A process of producing a peanut oil as set forth in claim 11, in which said slurry is fractionated in said first step of fractionation by means of a centrifuge of a basket type.

17. A process of producing a peanut oil as set forth in claim 11, in which each of the liquid and solid fractions obtained in said first step of fractionation is fractionated in each of said second and third steps of fractionation by means of a centrifuge of a basket type.

18. A process of producing a peanut oil as set forth in claim 1, 2 or 3, in which the mixture of the liquid fractions obtained in said second and third steps of fractionation is fractionated into said water fraction, oil fraction and residual solid fracton by means of a three-phase centrifuge.

19. A process of producing a peanut oil as set forth in claim 1, 2 or 3, in which said predetermined period of time for which the peanut seeds cleared of the skins are immersed in hot water ranges between about 3 minutes and about 5 minutes.

20. A process of producing a peanut oil as set forth in claim 1, 2 or 3, in which the peanut seeds are immersed in the hot water at a pressure higher than an atmospheric pressure.

21. A process of producing a peanut oil as set forth in claim 1, 2 or 3, in which the peanut seeds are immersed in the hot water at an atmospheric pressure.

22. A process of producing a peanut oil as set forth in claim 1, 2 or 3, in which said slurry of the ground peanut seeds is diluted with a substantially equal volume of hot water of a predetermined temperature within the range of between about 90° C. and about 100° C. in a mixing bath provided with an agitator.

* * * * *

UNITED STATES PATENT AND TRADEMARK OFFICE

CERTIFICATE OF CORRECTION

PATENT NO. : 4,476,057

DATED : Oct. 9, 1984

INVENTOR(S) : Akihiro Matsunaga

It is certified that error appears in the above-identified patent and that said Letters Patent are hereby corrected as shown below:

ABSTRACT, line 14, "liquid" should read --oil--

Col. 1, line 38, "the grade" should read --degrading--
line 62, "liquid" should read --oil--

Col. 2, lines 2,3,8,9, "meter" should read --centimeter--

Col. 3, lines 6,7,35, "meter" should read --centimeter--
line 37, after "seeds" insert --would--
line 41, "lower" should read --upper--
lines 44,54,55, "meter" should read --centimeter--

Col. 4, line 38, before "oil" insert --an--
line 47, "60" should read --65--

Col. 5, line 60, "was" should read --were--
line 61, "110" should read --100--
line 64, "meter" should read --centimeter--

Col. 6, line 68,"meter" should read --centimeter--

Col. 7, line 9, "grams" should read--kilograms--
lines 13,36,53, "meter" should read--centimeter--

Col. 8, lines 2,19, "meter" should read --centimeter--

UNITED STATES PATENT AND TRADEMARK OFFICE

CERTIFICATE OF CORRECTION

PATENT NO. : 4,476,057 Page 2 of 2

DATED : Oct. 9, 1984

INVENTOR(S) : Akihiro Matsunaga

It is certified that error appears in the above-identified patent and that said Letters Patent is hereby corrected as shown below:

Col. 9, line 25, "liquid" should read --oil--

Col. 9, lines 34, 35, 41 and 42 "meter" should read --centimeter--.

Signed and Sealed this

Twenty-second Day of September, 1987

*Attest:*

DONALD J. QUIGG

*Attesting Officer* *Commissioner of Patents and Trademarks*